Sept. 13, 1955  J. H. BLAIR, JR  2,717,548
CONTAINER TRAVERSING MECHANISM
FOR FOOD PROCESSING APPARATUS
Filed Aug. 6, 1952

INVENTOR
Joseph H. Blair, Jr.,

BY

ATTORNEY

United States Patent Office 2,717,548
Patented Sept. 13, 1955

2,717,548

CONTAINER TRAVERSING MECHANISM FOR FOOD PROCESSING APPARATUS

Joseph H. Blair, Jr., Milwaukee, Wis., assignor, by mesne assignments, to Food Machinery & Chemical Corporation, San Jose, Calif., a corporation of Delaware Application August 6, 1952, Serial No. 302,930

5 Claims. (Cl. 99—360)

The invention relates to food processing apparatus, and more especially to apparatus for the heating and/or cooling of comestibles in sealed containers, and has for its principal object the provision of an improved mechanism for traversing the containers through such an apparatus.

In the field of commercial food processing several forms of apparatus have been employed or proposed for effecting heating and/or cooling of the products after they have been sealed in cylindrical metallic cans and in which the operation is continuous in order that large scale production may be secured. One form of such apparatus has comprised an elongated open-topped vat or tank through which a heat-exchange liquid is continuously circulated and in the lower portion of which is mounted a plurality of power driven rolls extending longitudinally of the tank in parallel transversely spaced relation. These rolls serve to support axially alined series of the filled and sealed containers in the valleys between them, and to rotate said containers while they are partially or completely submerged in the heat-exchange medium. The containers are continuously fed to the rolls adjacent one end of the apparatus, traversed along the valleys in axially alined relation, and continuously removed from the rolls and heat-exchange liquid adjacent the other end of the tank.

Anything tending to impede rotation of the containers by the rolls results in an appreciable power loss, and in apparatus intended to handle several hundred cans at a time such loss becomes an important factor. Thus, a traversing mechanism which involved a sliding contact between it and any portion of the containers would tend to retard their rotation and be measurably inefficient. Furthermore, since most of the containers commonly used in this field are of the tin-coated sheet steel type, such sliding contact would tend to destroy the tin coating, leaving the base metal exposed and subject to rust and deterioration as a result of its submergence in the heat-exchange medium or its subsequent exposure to moisture in the atmosphere.

The present invention provides a mechanism for effecting longitudinal movement of containers in the valleys of a processing apparatus of the type above described, in a manner which substantially avoids the undesirable results just mentioned, in that it imposes no appreciable retarding effect upon the rotation of the containers by the supporting rolls, nor does it abrade the tin or other coating of the containers whereby to expose the base metal.

While susceptible of embodiment in several forms, insofar as changes in details of construction and precise arrangement of parts are concerned, a preferred form of mechanism constructed in accordance with the principles of the invention is illustrated in the accompanying drawing forming a part of this specification, in which like parts are designated by like reference characters in all the views and in which.

Figure 1:
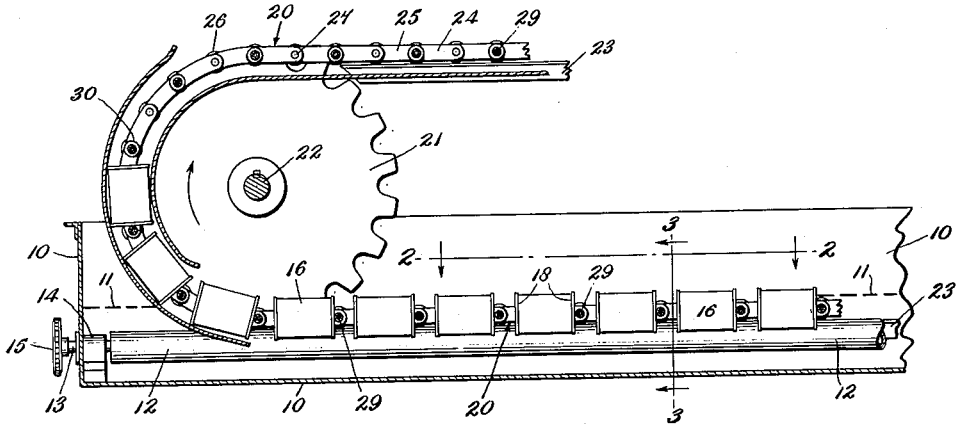
Figure 1 is a longitudinal vertical sectional view of one end portion of a longitudinal roll processing apparatus such as above mentioned, equipped with the present container-traversing mechanism, and with those elements of said processing apparatus not essential to an understanding of the invention omitted for the sake of clarity.

Referring to the said drawing in greater detail, the processing apparatus there shown comprises an elongated tank or vat 10 through which the heat-exchange medium, e. g., hot or cold water, may be circulated in any conventional manner, to approximately the depth indicated at 11. A plurality of rolls 12 are disposed in the lower portion of said tank in parallel transversely spaced relation and extending from one end of the tank to the other. The stub-shafts 13 which project from the ends of said rolls are journaled in bearings 14 and at one end they extend through the tank wall and are provided with sprockets or gears 15 by means of which the rolls may be rotated from any appropriate source of power, not shown. Although four rolls are here shown, obviously a greater or less number may be provided, depending upon the capacity desired for the apparatus.

Figure 3:
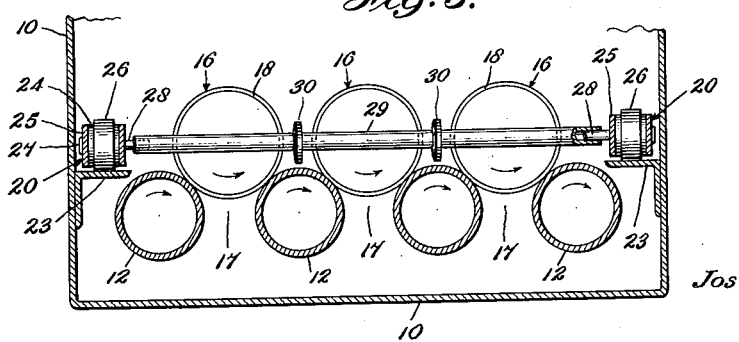
Fig. 3 is a transverse sectional view, on a still larger scale, taken on the plane indicated by the line 3—3 in Fig. 1 and looking in the direction of the arrows.

The cylindrical cans 16, filled with comestibles and sealed in the usual manner, are continuously supplied to the apparatus by any suitable feeding device constituting no part of the present invention, said cans being deposited in the several valleys 17 between adjacent rolls 12 with their axes parallel to those of the rolls and with each end bead 18 of each container contacting the surface of each of its supporting rolls at a single tangential point. The rolls 12 are all rotated in the same direction by their driving means, which rotation, through the frictional contacts between the rolls and the can beads 18, will produce rotation of all the containers in an opposite direction, as indicated by the arrows in Fig. 3. As is well understood in the art, such rotation of the cans is desirable as it facilitates heat transfer between the heat-exchange medium in the tank and the contents of the containers.

In order that the apparatus may function continuously the axially alined series of cans 16 must be traversed longitudinally along the valleys 17, preferably with as little impediment to the rotation of the cans as possible. The present mechanism for effecting such traverse comprises two endless chains 20, disposed one along each side wall of the tank 10 and trained about sprockets 21 carried by transverse shafts 22 suitably journaled adjacent each end of the tank and one of which is appropriately driven from said source of power. The horizontal runs of these chains between the sprockets are supported by angle-iron rails 23 secured to or supported by the side walls of the tank 10. The chains 20 are or may be of a well known roller type extensively employed in power-driven conveyer work and comprising alternate roller links 24 and pin links 25. The said roller links each journal a pair of rollers 26 which run on the rails 23, while each pin link 25 carries a pair of chain pins 27 which pass through the roller journaling bushings of the adjacent roller links 24 to provide articulating joints between the several links.

Figure 2:
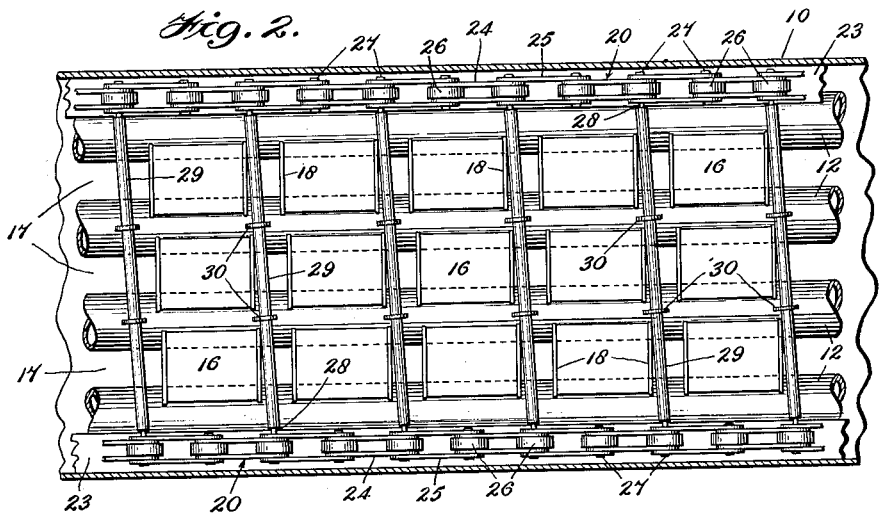
Fig. 2 is a sectional-plan view, on a somewhat larger scale, of a portion of the parts shown in Fig. 1, taken on the plane indicated by the line 2—2 thereof and looking down.

Certain of the chain pins 27 of each chain 20—here shown as each alternate pin—are provided with inward extensions 28 which mount the end portions of pusher members 29 that extend transversely of the tank 10 from chain to chain, between longitudinally adjacent containers of the several series. Thus, as the chains travel along the rails 23, from right to left as viewed in Fig. 2, the pusher members 29 will engage the end faces of the beads 18 of the several cans immediately ahead of each pusher member and propel such cans along the valleys 17.

If the pusher members were merely non-rotatable "through rods" extending from chain to chain, as is common in many conveyor constructions, the frictional resistance between such rods and the cans at the points of contact would not only impose an objectionable drag on rotation of the cans by the rolls 12 with resultant power loss, but would also abrade or damage the thin tin or other coating on the container metal thereby exposing the base metal to oxidation, all as above pointed out. Therefore, the members 29 take the form of tubes or rollers the end portions of which are journaled on the extensions 28 of the chain pins 27, as will be readily understood from Fig. 3, so that there may be a rolling rather than a sliding contact between the cans and the said members 29. It will also be clear from said figure that the axes of the pusher rollers are disposed in substantially the same horizontal plane as the axes of the cans so that the rollers cross the can ends diametrically thereof.

Even with the pusher members being so constructed and mounted for rotation and rolling contact with the can ends, the object thereof would be defeated if said pusher members engaged each can at more than one point. Rotation of the rollers 19 results solely from their engagement with the rotating cans and if such contacts occur at diametrically opposite points on the can beads, since such points are moving in opposite directions so far as the roller surface is concerned, their tendencies to produce rotation of the pusher rollers would be opposite and equal, thereby canceling one another. The said rollers thus would not be rotated and their contacts with the cans would be of the objectionable sliding type.

Provision is therefore made whereby the pusher rollers 29 will engage each can end at only a single peripheral point. Although this result may be attained in other ways, in the exemplification shown in the present drawing it is accomplished by giving one chain 20—the top one in Fig. 2—a lead over the other chain, whereby the axes of the pusher rollers are somewhat angularly displaced from planes perpendicular to the axes of the can-supporting and rotating rolls 12. Thus, as will be clear from Fig. 2, each pusher roller 29 engages the bead of each forwardly adjoining can 16 at but a single peripheral point and since all such points of engagement are moving in the same direction the rollers are rotated thereby and a rolling contact between the cans and pusher members results which imposes substantially no drag and abrasive action on the cans.

The angular displacement of the axes of the pusher rollers from the perpendicular to the supporting roll axes need be only on the order of from 3 to 5 degrees, and interposes no difficulties as regards travel of the rollers in the curved paths around the sprockets 21. The lead of the one chain over the other may be attained by slight angular displacement on the shafts 22 of the sprockets 21 at the one side of the apparatus as compared to the sprockets at the other side. In some instances, depending upon the width of the apparatus as compared to the pitch of the chains 20, the desired angularity of the pusher rollers 29 may be secured by journaling one of the ends of such rollers on the forward chain pin of a pin link 25 and their other ends on the rearward pins of the corresponding links of the other chain, in which case the lead of the one chain over the other may be dispensed with.

Each pusher roller 29 is provided with an appropriate number of flanges 30 so spaced along its length as to travel substantially in the vertical planes of the axes of the supporting rolls 12, which flanges serve to restrict lateral movements of the containers during travel thereof along portions of the apparatus other than the valleys 17 between the rolls 12.

What is claimed is:

1. In apparatus for processing comestibles in sealed cylindrical containers, a tank for containing a heat-exchange liquid; a plurality of parallel rolls rotatably mounted in said tank in transversely spaced relation and adapted to support axially alined series of said cylindrical containers in the valleys between such rolls; means for rotating the rolls whereby to rotate said containers about their axes; means for advancing said containers longitudinally along said valleys, comprising pusher rollers extending transversely of the container-supporting rolls and disposable between longitudinally adjacent containers supported by the latter, with the circumferential surfaces of said pusher rollers arranged to contact the end face of each container forwardly adjacent such rollers at substantially a single peripheral point; and means for moving said pusher rollers longitudinally of the supporting rolls.

2. In apparatus for processing comestibles in sealed cylindrical containers, a tank for containing a heat-exchange liquid; a plurality of parallel rolls rotatably mounted in said tank in transversely spaced relation and adapted to support axially alined series of said cylindrical containers in the valleys between such rolls; means for rotating the rolls whereby to rotate the containers about their axes; means for advancing said containers along said valleys, comprising pusher rollers disposed transversely of the container-supporting rolls between longitudinally adjacent containers supported by the latter, the axes of said pusher rollers being slightly angularly displaced from planes perpendicular to the supporting roll axes whereby said pusher rollers contact the end face of each container immediately forward thereof at a single peripheral point; and means for moving said pusher rollers longitudinally of said valleys.

3. In apparatus for processing comestibles in sealed cylindrical containers, a tank for containing a heat-exchange liquid; a plurality of parallel rolls rotatably mounted in said tank in transversely spaced relation and adapted to support axially alined series of said cylindrical containers in the valleys between such rolls; means for rotating the rolls whereby to rotate said containers about their axes; means for advancing the containers longitudinally along said valleys, comprising spaced chains paralleling said supporting rolls, and pusher rollers disposed between and rotatably mounted by said chains, said pusher rollers being spaced for disposition between longitudinally adjacent containers positioned in the valleys with the axes of such rollers disposed in substantially the horizontal plane of the axes of said containers and portions of the circumferential faces of said rollers being disposed for contact with the end face of each forwardly adjacent container at a single peripheral point; and means for moving said chains longitudinally of said supporting rolls.

4. In apparatus for processing comestibles in sealed cylindrical containers, a tank for containing a heat-exchange liquid; a plurality of rolls rotatably mounted in said tank in parallel transversely spaced relation and adapted to support axially alined series of said containers in the valleys between such rolls; means for rotating said rolls whereby to rotate containers supported thereby about their axes; means for advancing said containers longitudinally along said valleys, comprising spaced chains paralleling said supporting rolls adjacent the sides of the tank, and pusher rollers disposed between and rotatably mounted by said chains, said pusher rollers extending between longitudinally adjacent containers positioned in the valleys and having their axes slightly angularly displaced from planes perpendicular to the supporting roll axes whereby the pusher rollers contact the end face of each forwardly adjacent container at a single peripheral point; and means for moving said chains longitudinally of said supporting rolls.

5. In apparatus for processing comestibles in sealed cylindrical containers, a tank for containing a heat-exchange liquid; a plurality of parallel rolls rotatably mounted in said tank in transversely spaced relation and adapted to support axially alined series of said cylindrical containers in the valleys between such rolls; means for rotating the rolls whereby to rotate said containers about their axes; means for advancing said containers longitudinally along said valleys, comprising pusher rollers extending transversely of the container-supporting rolls and spaced for disposition between longitudinally adjacent containers supported by the latter, the circumferential faces of said pusher rollers being arranged to contact the end face of each container immediately forward thereof at a single peripheral point, and said pusher rollers being provided with flanges disposed for positioning intermediate transversely adjacent series of containers whereby to restrain transverse movements of the containers; and means for moving said pusher rollers longitudinally of the supporting rolls.

References Cited in the file of this patent

UNITED STATES PATENTS

| | | |
|---|---|---|
| 1,250,764 | Baker | Dec. 18, 1917 |
| 1,828,961 | De Back | Oct. 27, 1931 |
| 1,851,820 | Dunbar | Mar. 29, 1932 |
| 2,284,269 | Eberts | May 26, 1942 |